Oct. 28, 1924. 1,513,659
G. W. WARDWELL
LUBRICATING AND SEALING MEANS FOR ROTARY PUMPS
Filed Oct. 24, 1923 2 Sheets-Sheet 1
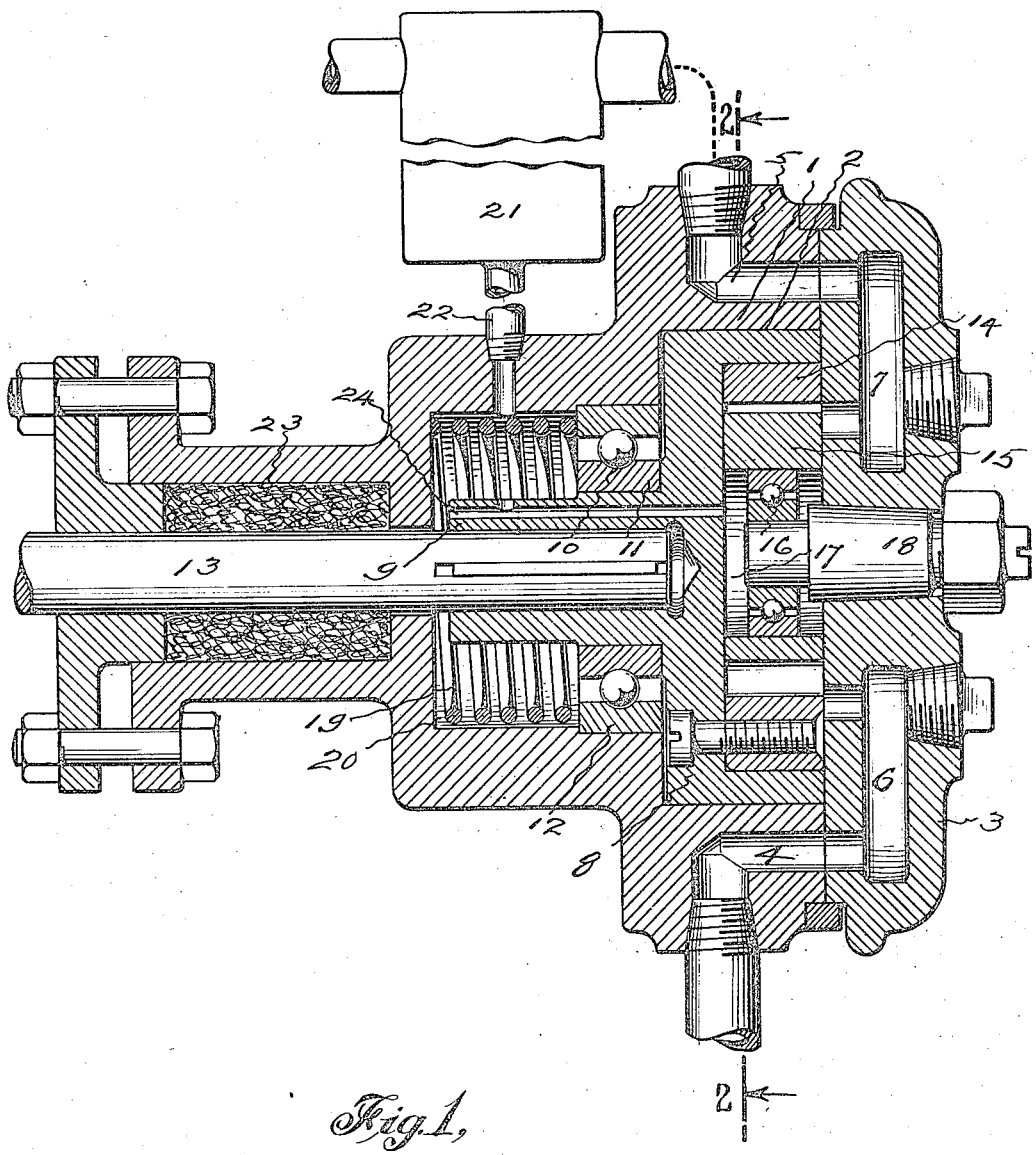
Fig.1,
INVENTOR
George W. Wardwell
BY Harry R. Williams
ATTORNEY Oct. 28, 1924.
G. W. WARDWELL
1,513,659
LUBRICATING AND SEALING MEANS FOR ROTARY PUMPS
Filed Oct. 24, 1923     2 Sheets-Sheet 2
Fig. 2,
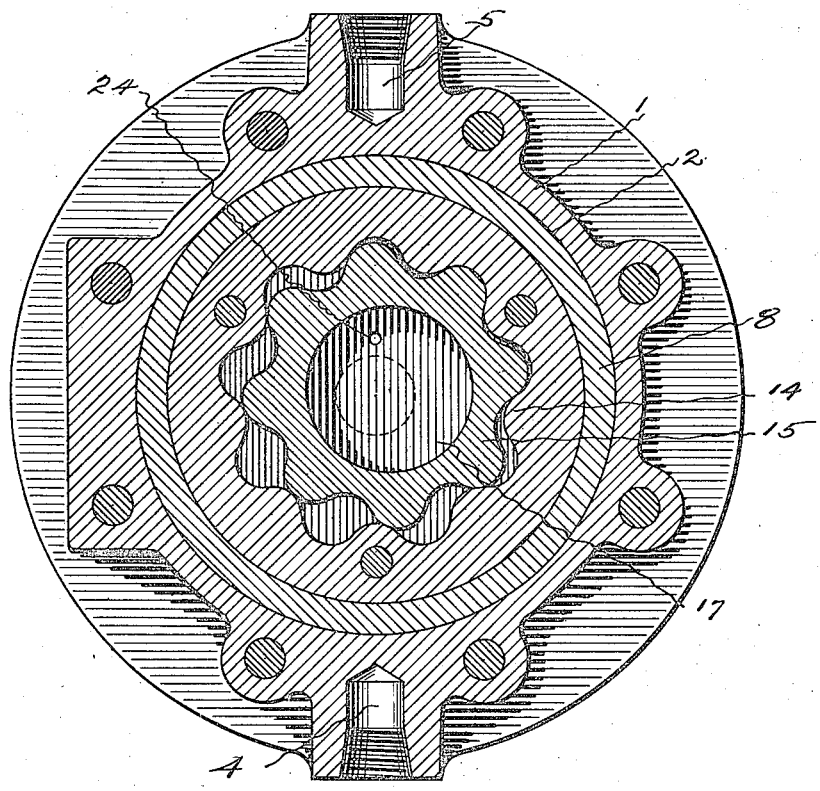
INVENTOR
George W. Wardwell
BY
Harry R. Williams
ATTORNEY Patented Oct. 28, 1924.

1,513,659

UNITED STATES PATENT OFFICE.

GEORGE W. WARDWELL, OF SOUTH NORWALK, CONNECTICUT, ASSIGNOR TO THE HILL COMPRESSOR AND PUMP COMPANY, OF NEW YORK, N. Y., A CORPORATION OF DELAWARE.

LUBRICATING AND SEALING MEANS FOR ROTARY PUMPS.

Application filed October 24, 1923. Serial No. 670,496.

*To all whom it may concern:*

Be it known that I, GEORGE W. WARDWELL, a citizen of the United States, residing at South Norwalk, in the county of Fairfield and State of Connecticut, have invented a new and useful Improvement in Lubricating and Sealing Means for Rotary Pumps, of which the following is a specification.

This invention relates to rotary pumps for pumping fluids of the type having an internally toothed driving gear engaged with an externally toothed driven gear of a different number of teeth.

The object of this invention is to provide a very simple means for lubricating the wearing surfaces between the gears and walls of the pump chamber, the circulation of the lubricating medium being automatically effected by the operation of the pump and providing a fluid seal for the joints which will reduce friction and prevent leakage, across the faces of the gear teeth of the fluid pumped without danger of choking the pump with lubricant.

This object is attained in the present instance by forming a duct for the passage of lubricant through the rotor from a lubricant holding and discharge pressure cavity back of the rotor to a central cavity in front of the rotor, whereby lubricant will be forced to the front of the rotor from which locality it will flow out between the faces of the gears and the face of the end of the pumping chamber in which the gears and rotor are located.

In the accompanying drawings Fig. 1 shows a central longitudinal section of a pump constructed according to this invention. Fig. 2 shows a transverse section of the pump on the plane indicated by the dotted line 2—2 on Fig. 1.

The casing 1 which is generally circular in outline contains a cylindrical pumping chamber 2 that is closed at one end by a head 3 which is fastened to the casing by any suitable means. The casing has an intake passage 4 on one side and a discharge passage 5 on the other side, while the head has an intake port 6 leading from the intake passage to the pumping chamber and a discharge port 7 leading from the pumping chamber to the discharge passage. Rotatably fitting and having a slight movement axially in the pumping chamber is a rotor 8. The hub 9 of the rotor is mounted on anti-friction bearings 10 the inner ring 11 of which is fastened to the hub while the outer race ring 12 is fitted so that it may have a slight axial movement in the casing. The driving shaft 13 is splined in the hub of the rotor so that while the shaft will turn the rotor it will not interfere with the axial movement of the rotor. Fastened in the rotor is an internally toothed gear 14 and engaging the teeth of this gear are the teeth of an externally toothed gear 15. The externally toothed gear is mounted on anti-friction bearings 16 arranged in a cavity 17 in the gear and supported by a stud 18 fastened in the head. The stud is positioned out of line with the driving shaft so that the axis of the externally toothed gear will be eccentric with the axis of the internally toothed gear. One of these gears has more teeth than the other and they coact in a well known manner to effect the pumping or compression of fluids.

A spring 19 is arranged in a cavity 20 that communicates with the pumping chamber, in such manner that it thrusts against the outer race ring 12 and through the bearing presses the rotor and the faces of the pumping gears against the inner face of the head. Lubricant is introduced into this cavity. Leading from the reservoir 21 into which the fluid is pumped, to the cavity containing the spring is a pipe 22. The function of this connection is to admit discharge pressure to the cavity and permit it to be exerted on the back of the rotor. This connection also is adapted to conduct back lubricant which has been forced through the joints of the pump and out through the discharge pipe. A common type of gland packing 23 is arranged in the end of the casing to prevent leakage from the spring cavity around the driving shaft.

In order to accomplish the object of this invention a duct or passage 24 is made through the hub of the rotor from the pressure cavity containing the spring back of the rotor to the cavity containing the bearing for the externally toothed gear in front of the rotor. When the pump is running the centrifugal force of the externally toothed gear and the fact that it wipes around on the face of the head is sufficient to allow just the right amount of lubricant to work out on the faces of the gears and also between the contacting faces of the teeth. The lubricant which escapes passes through the discharge and is returned to the pressure chamber so as to furnish a continuous supply of lubricant under pressure. When the pump stops even though there is pressure on the lubricant in the cavity the lubricant will not flow into the inlet spaces between the teeth for with pressure behind the rotor the faces of the teeth are in tight sealing position, with relation to the head, and the externally toothed gear is in tight sealing position with relation to the inner face of the rotor. When the pump is started the flow of lubricant is automatically started and when the pump stops the flow of lubricant stops, but the lubricant remains in position to not only lubricate the wearing faces but also to fluid seal the joints.

The invention claimed is:—

1. A rotary pump comprising a casing containing a pumping chamber, a head closing one end of the pumping chamber, said head having an intake to and discharge from said chamber, a rotor rotatable in and having an axial movement in said chamber, intermeshing internally toothed and externally toothed pumping gears in front of the rotor, said internally toothed gear being fastened to the rotor, a pressure cavity in the casing open to the back of the rotor, means connecting said pressure cavity with the discharge from the pump, and a passage extending axially through the rotor to a cavity in the center of the gears for admitting discharge pressure from the cavity back of the rotor to the cavity in the center of the gears and permitting lubricant to flow from the cavity back of the rotor to the front of the rotor and work out between the end faces of the gear teeth and the head end wall of the pumping chamber, to the discharge.

2. A rotary pump comprising a casing containing a pumping chamber, a head closing one end of the pumping chamber, said head having an intake to and discharge from said chamber, a rotor rotatable in and having an axial movement in said chamber, intermeshing internally toothed and externally toothed pumping gears in front of the rotor, said internally toothed gear being fastened to the rotor, a pressure cavity in the casing open to the back of the rotor, a spring located in said cavity and adapted to press the rotor forward, means connecting said pressure cavity with the discharge from the pump, and a passage extending axially through the rotor to a cavity in the center of the gears for admitting discharge pressure from the cavity back of the rotor to the cavity in the center of the gears and permitting lubricant to flow from the cavity back of the rotor to the front of the rotor and work out between the end faces of the gear teeth and the head end wall of the pumping chamber, to the discharge.

3. A rotary pump comprising a casing containing a pumping chamber, a head closing one end of the pumping chamber, said head having an intake to and discharge from said chamber, a rotor rotatable in and having an axial movement in said chamber, intermeshing internally toothed and externally toothed pumping gears in front of the rotor, said internally toothed gear being fastened to the rotor, a pressure cavity in the casing open to the back of the rotor, means connecting said pressure cavity with the discharge from the pump, bearings for the externally toothed gear in a cavity in said gear in front of the rotor, and a passage extending axially through the rotor from the pressure cavity to the bearings cavity for admitting discharge pressure from the pressure cavity back of the rotor to the bearings cavity in front of the rotor and permitting lubricant to flow from the cavity back of the rotor to the front of the rotor and work out between the end faces of the gear teeth and the head end wall of the pumping chamber, to the discharge.

4. A rotary pump comprising a casing containing a pumping chamber, a head closing one end of the pumping chamber, said head having an intake to and discharge from said chamber, a rotor rotatable in and having an axial movement in said chamber, intermeshing internally toothed and externally toothed pumping gears in front of the rotor, said internally toothed gear being fastened to the rotor, a duct conducting discharge pressure from the pump to the back of the rotor, and a passage extending axially through the rotor for conducting discharge pressure to the front of the rotor and permitting lubricant to flow from the back of the rotor through the rotor to the front of the rotor and work out to the discharge between the end faces of the gear teeth and the head end wall of the pumping chamber.

5. A rotary pump comprising a casing containing a pumping chamber, a head closing one end of the pumping chamber, said head having an intake to and discharge from said chamber, a rotor rotatable in and having an axial movement in said chamber, intermeshing internally toothed and externally toothed pumping gears in front of the rotor, said internally toothed gear being fastened to the rotor, a pressure cavity in the casing back of the rotor, a spring in said cavity thrusting against the back of the rotor, means connecting said pressure cavity with the discharge from the pump, a cavity in front of the rotor, bearings in said front cavity, and a passage extending axially through the rotor and connecting said pressure cavity with said bearings cavity.

GEORGE W. WARDWELL.